United States Patent
Gotsmann et al.

(10) Patent No.: US 9,568,496 B1
(45) Date of Patent: Feb. 14, 2017

(54) SCANNING PROBE SENSOR WITH A FERROMAGNETIC FLUID

(71) Applicant: International Business Machines Corporation, Armonk, NY (US)

(72) Inventors: Bernd W. Gotsmann, Horgen (CH); Fabian Menges, Zurich (CH); Pio Peter Niraj Niramalraj, Zurich (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/943,150

(22) Filed: Nov. 17, 2015

(51) Int. Cl.
*G01Q 70/14* (2010.01)
*G01Q 60/56* (2010.01)
*G01Q 10/00* (2010.01)

(52) U.S. Cl.
CPC .............. *G01Q 60/56* (2013.01); *G01Q 10/00* (2013.01); *G01Q 70/14* (2013.01)

(58) Field of Classification Search
CPC ........ G01Q 60/38; G01Q 60/56; G01Q 70/10; G01Q 70/16; G01Q 60/08; G01Q 60/42; G01Q 60/50; G01Q 70/18; G01Q 70/14
USPC ..................................................... 850/25, 59
See application file for complete search history.

(56) References Cited

U.S. PATENT DOCUMENTS

| | | | |
|---|---|---|---|
| 7,170,842 B2 | 1/2007 | Gibson | |
| 2006/0197052 A1* | 9/2006 | Pugel | B82Y 15/00 252/62.55 |
| 2008/0302960 A1* | 12/2008 | Meister | B82Y 35/00 250/306 |
| 2010/0205699 A1* | 8/2010 | Tachizaki | B82Y 15/00 850/47 |

FOREIGN PATENT DOCUMENTS

WO 2009001220 A2 12/2008

OTHER PUBLICATIONS

J. Liu, et al., "Numerical study of the formation process of ferrofluid droplets", Article in Physics of Fluids, ResearchGate, vol. 23, Jan. 2011, p. 1-11.

* cited by examiner

*Primary Examiner* — Brooke Purinton
(74) *Attorney, Agent, or Firm* — Cantor Colburn LLP; Daniel Morris

(57) ABSTRACT

The invention is notably directed to a scanning probe sensor for a scanning probe microscope. The scanning probe sensor comprises a probe tip having a ferromagnetic fluid and a magnetic field generator adapted to generate a magnetic field acting on the ferromagnetic fluid. Furthermore, a sensor controller is provided and configured to control one or more parameters of the magnetic field generator, thereby controlling the shape of the fluid. The invention further concerns a related scanning probe sensor, a related method and a related computer program product.

20 Claims, 6 Drawing Sheets

SCANNING PROBE SENSOR WITH A FERROMAGNETIC FLUID

BACKGROUND

The invention relates to a scanning probe sensor. The invention further concerns a related scanning probe microscope, a related method and a related computer program product.

Various scanning probe microscopy techniques exist to image surface and electrical properties of samples down to nanoscopic and even atomic scale. All these techniques rely on scanning probes, typically comprising a sharp tip, in close proximity or even in contact with a sample surface to monitor interactions between the probe and the sample, e.g. force or tunnel current. The signal measured is fundamentally related to the shape (sharpness, opening angle) of the scanning probe defining the tip-sample contact. A sharp tip is typically required to achieve high spatial resolution down to atomic and even intermolecular resolution limits. The fabrication of a sharp scanning probe tip is challenging but tip apex radii below 10 nm can typically be achieved by present day electron beam lithography.

The exact shape of the tip apex, however, is typically not fully controlled in the manufacturing process. Scanning electron microscopy (SEM) is frequently applied to better describe the tip before measurement. Other techniques to characterize the tip shape are based on reverse imaging techniques and mathematical reconstruction of the apex shape by imaging surfaces of well defined, known topographies. If the surface topography is unknown, blind-reconstruction is applied to quantify the tip apex shape.

Despite these possibilities to measure the tip shape, remaining uncertainties and the continuous changing of tip shape during the measurement remain a challenge in the use of scanning probe microscopy methods for quantitative analysis. Controlling and maintaining the tip shape is critical for scanning probe measurement signals which are acquired by a convolution of the sample properties to be characterized and the properties of the scanning probe tip itself.

Dynamic scanning modes, also denoted as non-contact scanning modes, have been developed to achieve high spatial resolution in order of a few nanometers. Using these modes of operation, the interaction forces between the probe tip and the sample can be controlled very precisely. This has enabled imaging of liquid droplet surfaces.

SUMMARY

According to a first aspect, the invention is embodied as a scanning probe sensor for a scanning probe microscope. The scanning probe sensor comprises a probe tip comprising a ferromagnetic fluid. Furthermore, the scanning probe sensor comprises a magnetic field generator adapted to generate a magnetic field acting on the ferromagnetic fluid. In addition, a sensor controller is provided that is configured to control one or more parameters of the magnetic field generator, thereby controlling the shape of the fluid.

According to another aspect a scanning probe microscope is provided comprising a scanning probe sensor according to the first aspect. The scanning probe microscope comprises a sample positioner configured to position a sample in relation to the scanning probe sensor. Furthermore, the scanning probe sensor comprises a system controller configured to control the sample positioner and the scanning probe sensor.

According to another aspect a method for operating a scanning probe sensor according to the first aspect is pro-vided. The method comprises a step of generating a magnetic field acting on the ferromagnetic fluid. The method comprises a further step of controlling one or more parameters of the magnetic field, thereby controlling the shape of the fluid.

According to another aspect a computer program product is provided for controlling the scanning probe sensor according to the first aspect. The computer program product comprises a computer readable storage medium having stored thereon program instructions executable by the sensor controller of the scanning probe sensor to cause the scanning probe sensor to control one or more parameters of the magnetic field generator, thereby controlling the shape of the fluid.

DETAILED DESCRIPTION

A ferromagnetic fluid, also sometimes denoted as ferrofluid, may be defined as a liquid that becomes magnetized in the presence of a magnetic field. Ferromagnetic fluids encompass colloidal liquids made of nanoscale ferromagnetic particles suspended in a carrier fluid. The carrier fluid may be embodied e.g. as an organic solvent or water. Each particle may be coated with a surfactant to inhibit clustering. The magnetic attraction of the particles is weak enough that clustering of the magnetic particles can be prevented by using surfactants.

When a ferromagnetic fluid is subjected to a vertical magnetic field, the surface of the ferromagnetic fluid forms a regular pattern of peaks and valleys. This effect is known as the normal-field instability. The instability is driven by the magnetic field. It may be explained by considering which shape of the fluid minimizes the total energy of the system. From the point of view of magnetic energy, peaks and valleys are energetically favorable. In the corrugated configuration, the magnetic field is concentrated in the peaks. Since the ferromagnetic fluid is more easily magnetized than the air, the magnetic energy is lowered. As a result, the spikes of the ferromagnetic fluid ride the field lines out into space until there is a balance of the forces involved.

At the same time the formation of peaks and valleys is resisted by gravity and surface tension. It costs energy to move fluid out of the valleys and up into the spikes, and it costs energy to increase the surface area of the fluid. In summary, the formation of the corrugations increases the surface free energy and the gravitational energy of the liquid, but reduces the magnetic energy. The corrugations will only form above a critical magnetic field strength, when the reduction in magnetic energy outweighs the increase in surface and gravitation energy terms. Ferromagnetic fluids have a very high magnetic susceptibility and the critical magnetic field for the onset of the corrugations may be realized e.g. by a small bar magnet.

Figure 1:
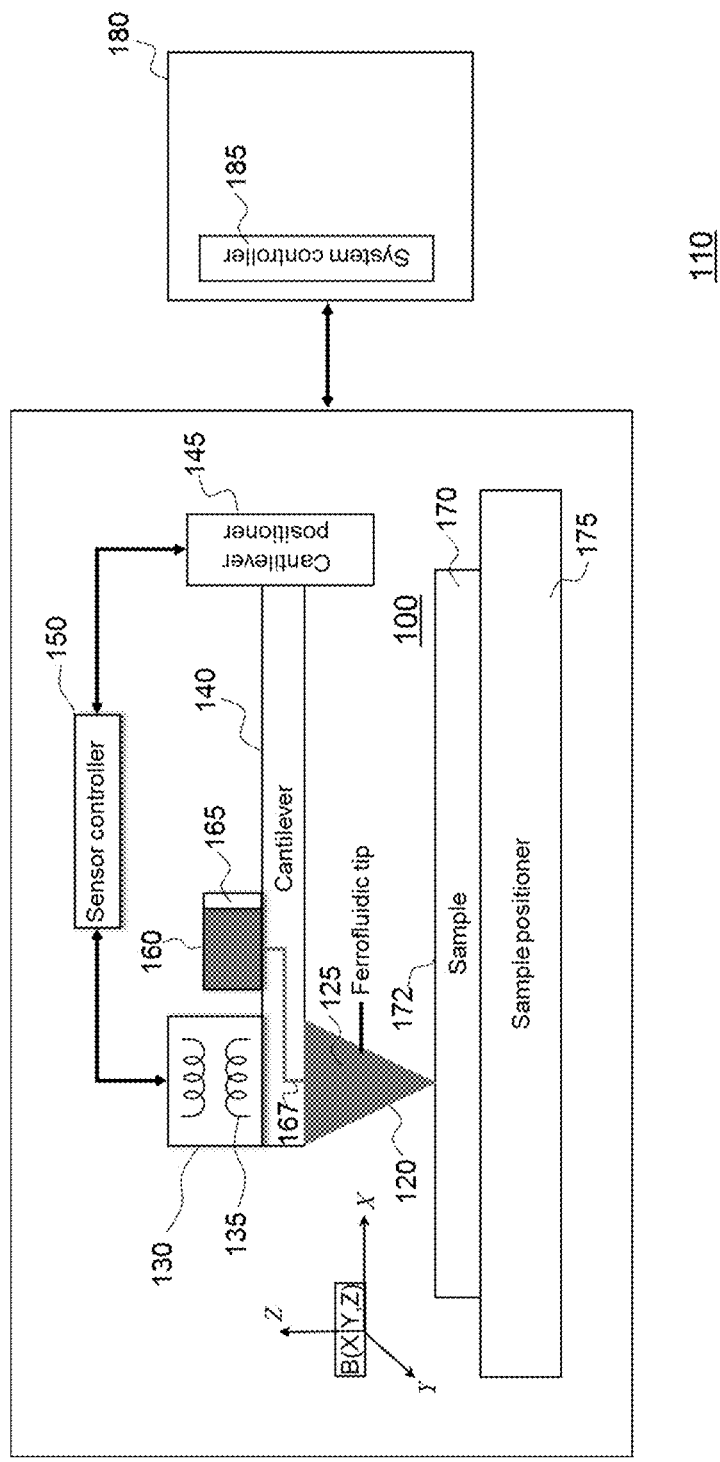
FIG. 1 illustrates a block diagram of a scanning probe microscope comprising a scanning probe sensor.

FIG. 1 shows a scanning probe sensor 100 for a scanning probe microscope 110. The scanning probe sensor 100 comprises a probe tip 120. The probe tip 120 comprises a ferromagnetic fluid 125. More particularly, the probe tip 120 in FIG. 1 is embodied as a probe tip that solely consists of the ferromagnetic fluid 125. The probe tip 120 is arranged on a cantilever 140. The cantilever 140 can be positioned by a cantilever positioner 145, the latter being arranged at one end of the cantilever 140. The cantilever positioner 145 may be embodied in various ways. According to one embodiment it may provide positioning of the cantilever 140 in a Z-direction. According to other embodiments it may provide positioning of the cantilever 140 in three directions, namely in a X-direction, a Y-direction and the Z-direction. Adjacent to the probe tip 120 a magnetic field generator 130 is arranged on the cantilever 140. The magnetic field generator 130 is adapted to generate a magnetic field acting on the ferromagnetic fluid 125. The magnetic field generator 130 may be embodied e.g. by a plurality of electrical coils 135. The electrical coils 135 may be coupled to a not shown current source, the latter being adapted to supply an electrical current to the electrical coils 135. The current flowing through the electrical coils 135 induces a magnetic field B acting on the ferromagnetic fluid 125. In particular an arrangement of three coils may be used, wherein the axis of a first coil is arranged in the X-direction, the axis of a second coil is arranged in the Y-direction and the axis of a third coil is arranged in the Z-direction. This allows generating a three-dimensional magnetic field B acting on the ferromagnetic fluid 125.

The magnetic field generator 130 may be adapted to generate a constant magnetic field B or an alternating magnetic field B. A constant magnetic field B acting on the probe tip 120 results in a constant shape of the ferromagnetic fluid 125. An alternating magnetic field B acting on the probe tip 120 results in an alternating or periodically changing shape of the ferromagnetic fluid 125.

The scanning probe sensor 100 comprises furthermore a reservoir 160 for the ferromagnetic fluid 125 and a pump 165 for pumping the ferromagnetic fluid trough a channel 167 from the reservoir 160 to the probe tip 120. The reservoir 160, the pump 165 and the channel 167 may preferably be arranged on the cantilever 140. The scanning probe sensor 100 comprises furthermore a sensor controller 150 which is configured to control one or more parameters of the magnetic field generator 130. This allows controlling the shape of the ferromagnetic fluid 125.

According to embodiments the scanning probe sensor 100 is configured to control as parameter the strength of the magnetic field. This may be e.g. implemented by varying the strength of the electric current supplied to the coils 135 of the magnetic field generator 130. Generally, the stronger the magnetic field B acting on the ferromagnetic fluid 125, the sharper the probe tip 120.

The sensor controller 150 may be further configured to control as parameter one or more directions of the magnetic field B. This may be e.g. implemented by controlling the strength of the electrical current applied to the first, the second and the third coil of the magnetic field generator 130 as explained above. By controlling the one or more directions of the magnetic field B, the orientation of the probe tip 120 can be adapted and defined. More particularly, if e.g. the strength of the electrical current supplied to the coil that is arranged in the X-direction is higher than the strength of the electrical current supplied to the coils in the Y-direction and the Z-direction, then the ferromagnetic fluid 125 may shift or tilt in the X-direction.

The scanning probe microscope 110 comprises further a sample 170 with a sample surface 172 that is provided for scanning by the scanning microscope 110. The sample 170 is fixed on a sample positioner 175. The sample positioner 175 is provided for positioning the sample 170 in relation to the scanning probe sensor 100 and in particular in relation to the probe tip 120. The sample positioner 175 may be embodied in various ways. According to one embodiment it may provide positioning of the sample 170 in three directions, namely in the X-direction, the Y-direction and the Z-direction. According to another embodiment it may provide positioning of the sample 170 in two directions, namely in the X-direction and the Y-direction, wherein a relative movement between the sample 170 and the probe tip 120 in the Z-direction may be provided by the cantilever positioner 145.

The scanning probe microscope 110 comprises furthermore a computer system 180. The computer system 180 provides a user interface for operating the scanning probe microscope 110 with a plurality of user functions to the user. The computer system 180 may be embodied e.g. as a computer system as described with reference to FIG. 9 in more detail. In particular, the computer system 180 comprises a system controller 185 configured to control the operation of the scanning probe microscope 110 including the scanning probe sensor 100. The system controller 185 may be in particular provided for controlling the sample positioner 175, the cantilever positioner 145 and the sensor controller 150. According to another embodiment the system controller 185 comprises also the sensor controller 150. In other words, the sensor controller 150 and the system controller 185 may be integrated into one unit according to embodiments of the invention.

According to an embodiment the sensor controller 150 is configured to control the shape of the ferromagnetic fluid 125 in dependence on interactions between the ferromagnetic fluid 125 and the sample 170. This allows to operate the scanning probe microscope 110 in various measurement modes and to adapt the measurements to the respective sample-fluid interaction.

Embodiments of the invention provide a technical solution for controlling and maintaining the shape of the scanning probe tip 120. This facilitates precise measurements of the scanning probe microscope 110. More particularly, due to the controlled shape of the fluid 125, the shape of the tip 120 is always controlled and can be maintained and/or adapted for the respective measurement task/operation of the scanning probe microscope 110. Hence embodiments of the invention provide the advantage that a convolution of the measurement signals due to unknown tip shapes can be avoided. Additionally, embodiments of the invention provide stable and reliable tip shapes that do not suffer from degradation, caused e.g. by bluntening and/or particle pick-up after multiple scanning operations as in prior art systems.

Figure 2:
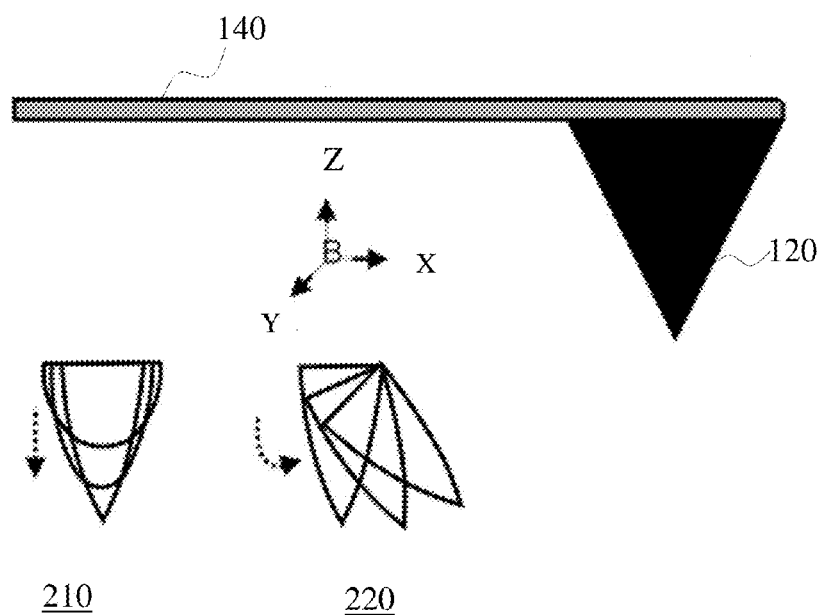
FIG. 2 shows a cantilever with a probe tip comprising a ferromagnetic fluid and a variety of tip shapes that can be derived by applying a magnetic field on the ferromagnetic fluid.

FIG. 2 shows a cantilever 140 with a probe tip 120 comprising a ferromagnetic fluid and a variety of tip shapes that can be derived by applying a magnetic field B on the ferromagnetic fluid. The sharpness of the tip shape can be increased by increasing the strength of the magnetic field in the Z-direction as illustrated with a first set of tip shapes 210. The orientation or tilting of the tip shape can be adjusted by changing the orientation of the magnetic field B acting on the ferromagnetic fluid. In the set of tip shapes 220 the magnetic field in the X-direction is increased, thereby shifting/tilting the tip shape from the Z-direction towards the X-direction.

Hence the shape of the probe tip 120 can be adjusted by the magnetic field applied to the probe tip and the detailed tip shape may be predicted as the result of a Rosenweig instability. More particularly, the achievable tip apex radius may be predicted as a function of the volume of the ferromagnetic fluid, the surface energy and the strength of the applied magnetic field. The minimum apex radius that can be achieved is limited by the size of the magnetic particles forming the ferromagnetic fluid (typical size <10 nm) and the surface energy of the ferromagnetic liquid. Depending on the sample material, oil-based or water-based ferromagnetic fluids may be used according to embodiments of the invention.

The following equation may be used according to embodiments to estimate the required magnetic field strength B:

$$B = \sqrt{\frac{Bo_m \times \mu_0 \times \gamma}{\chi(B) \times Ro}}$$

wherein, B=magnetic field strength; $Bo_m$=magnetic bond number (~25); $\mu_0$=vacuum permeability ($4\pi \times 10^{-7}$ H/m); $\gamma$=surface tension (43 mN/m e.g. for water based ferromagnetic fluids); $\chi$ (B)=magnetic susceptibility (0.75); and Ro=initial drop radius (e.g. 1 mm).

As an example, a probe tip radius of curvature of 100 nm using an initial drop radius of 1 µm corresponding to app. 0.5 nl of ferromagnetic fluid requires a magnetic field of 1.3421 Tesla for a water-based ferromagnetic fluid, and less than 1 Tesla for an oil-based ferromagnetic fluid assuming 20 mN/m surface tension for the latter.

Figure 3:
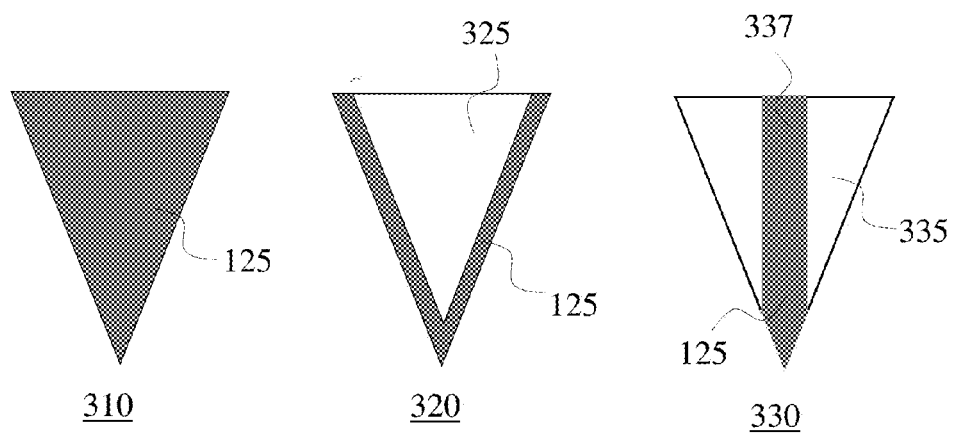
FIG. 3 illustrates three embodiments of a probe tip comprising a ferromagnetic fluid.

FIG. 3 illustrates three different embodiments of a probe tip. A first probe tip 310 consists solely of the ferromagnetic fluid 125. This corresponds to the embodiment of the probe tip 120 as described with reference to FIG. 1. This embodiment provides an enhanced level of freedom for a variety of tip shapes and is independent of a core or carrier structure. Another probe tip 320 is embodied as a solid core 325 that is surrounded by the ferromagnetic fluid 125. The solid core 325 provides a stable support for the probe tip 320. Furthermore, it limits the amount of ferromagnetic fluid 125 needed for creating the probe tip. Another probe tip 330 is embodied as a solid carrier structure 335 comprising a channel 337 for the ferromagnetic fluid 125. Such a solid carrier structure 335 provides a stable support for the probe tip 330. Furthermore, it limits the amount of ferromagnetic fluid 125 needed for creating the probe tip 330.

Figure 4:
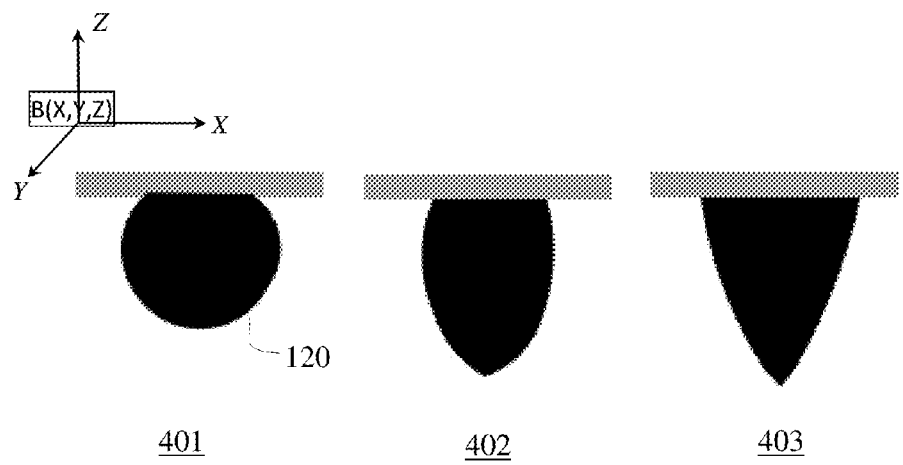
FIG. 4 shows some examples of shapes of a probe tip consisting of a ferromagnetic fluid that can be derived by applying a magnetic field on the ferromagnetic fluid.

FIG. 4 shows some examples of shapes of a probe tip 120 consisting of a ferromagnetic fluid that can be derived by applying a magnetic field on the ferromagnetic fluid. A first shape 401 shows a rather round droplet that may be formed without a magnetic field B acting on the ferromagnetic fluid. Another shape 402 may be formed by applying a magnetic field B in the negative Z-Direction on the ferromagnetic fluid. Another shape 403 may be formed by applying a magnetic field B in the negative Z-Direction on the ferromagnetic fluid which is stronger than the magnetic field applied to the tip shape 402.

According to an embodiment the time scale to change or alter the shape of the probe tip, e.g. between the shape 401 and the shape 402 of FIG. 4 may be 10 milliseconds or less. This allows a dynamic adaption of the tip shape during operation of the scanning probe microscope 110.

According to an embodiment the scanning probe sensor 100 is configured to operate in a non-contact scanning mode. This facilitates integrity of the probe tip 120. Furthermore, such an embodiment may prevent the formation of a liquid meniscus due to sample to capillary forces. Such an embodiment allows performing typical atomic force microscopy (AFM) measurements. In typical AFM operations, the probe tip may sometimes accidentally interfere stronger with the sample than anticipated. By using a tip comprising a ferromagnetic fluid according to embodiments of the invention, the tip shape can be immediately restored in response to the applied magnetic field. This avoids a damaged and/or contaminated tip as in prior art systems.

According to some embodiments the sensor controller 150 is configured to control one or more parameters of the magnetic field generator 130 such that the shape of the ferromagnetic fluid 125 changes periodically. This may provide dynamic mode operations and facilitates the excitation of a periodic interaction between the probe tip 120 and the surface 172 of the sample 170. A periodic change of the shape of the ferromagnetic fluid 125 may be implemented by providing periodically oscillating magnetic field acting on the ferromagnetic fluid 125 by the magnetic field generator 130. Such a periodically oscillating magnetic field may be achieved by supplying an alternating AC current to the coils 135 of the magnetic field generator 130. By providing a periodically changing tip shape, an easy and reliable way to excite a periodic tip-sample surface interaction can be achieved.

According to embodiments a multitude of excitation frequencies may be used to allow several simultaneous measurements, e.g. topography and electrostatic force measurements. According to other embodiments, the scanning probe sensor 100 is configured to operate in a contact scanning mode. According to such embodiments the probe tip 120 may be brought into stronger mechanical contact with the sample 170.

Such a contact scanning mode may be used to perform measurements that exploit the contact between the probe tip 120 and the sample 170. This may be e.g. the heat transfer between the probe tip 120 and the sample 170 as used in scanning thermal microscopy. Furthermore it may be the friction force between the probe tip 120 and the sample 170 as used in friction force microscopy or the electronic transport between the probe tip 120 and the sample 170 as used in spreading resistance or scanning conductance microscopy.

Figure 5:
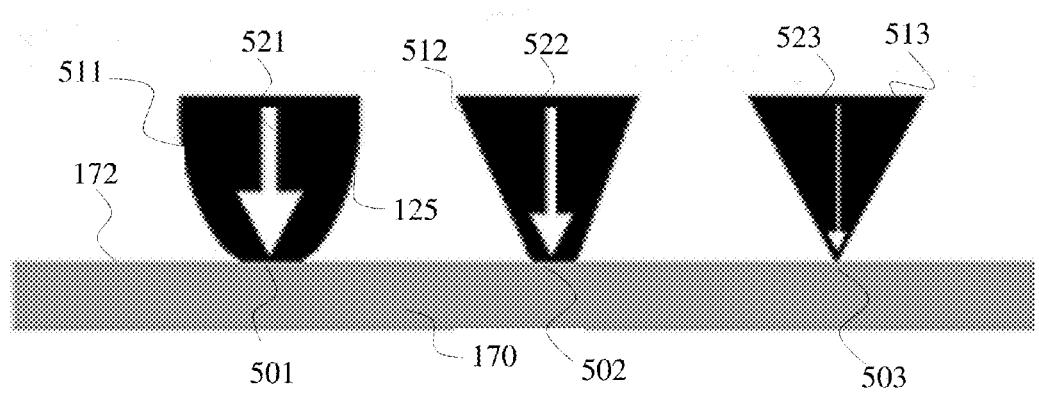
FIG. 5 shows shapes of a probe tip of a scanning probe sensor according to embodiments of the invention that are operated in a contact scanning mode, wherein the probe tips have different contact area sizes with the sample.

As illustrated with reference to FIG. 5, according to embodiments of the contact scanning mode, the sensor controller 150 of the scanning probe sensor 100 is configured to control the one or more parameters of the magnetic field generator 130 such that the size of the contact area between the fluid 125 and the sample 170 is dynamically adapted. In embodiments of the contact scanning modes, the size of the contact area between the probe tip 120 and the sample surface 172 is a parameter that can be used to quantify the data of the measurement. Hence such embodiments allow extracting information on the measured properties such as the intrinsic length scale of transport properties and the varying of the probing depth depending on the contact diameter or size of the contact area respectively.

To gather information on these properties, the size of the contact areas can be varied in a reliable and versatile way according to embodiments of the invention. Furthermore, embodiments of the invention allow varying the contact diameter in a measurement over an order of magnitude or more by applying appropriate magnetic fields acting on the ferromagnetic fluid of the probe tip.

By using a ferromagnetic fluidic tip 120, the contact geometry is influenced by the surface energies via contact angles. This can be modified using the magnetic forces induced into the ferromagnetic fluid 125. The final probe tip—sample surface contact size or contact radius can be adjusted dynamically then. FIG. 5 shows three different shapes of the ferromagnetic fluid 125 with three different sizes of the contact area between the fluid 125 and the sample 170. A first shape 511 provides a contact area 501 with a relatively large size. The large contact area 501 corresponds with large measurement signals 521 in the probe tip 120. A second shape 512 provides a contact area 502 with a medium size. The medium sized contact area 502 corresponds with medium measurement signals 522 in the probe tip 120. A third shape 513 provides a contact area 503 with a small size. The small sized contact area 503 corresponds with small measurement signals 523 in the probe tip 120.

According to further embodiments as illustrated with reference to FIG. 6, the scanning probe sensor 100 and more particularly the sensor controller 150 is configured to control the one or more parameters of the magnetic field generator 130 such that a plurality of predefined tip shapes is provided. With such embodiments one may account e.g. for typical convolution features observed in prior art AFM topography measurements. According to embodiments, the real topography of the sample surface can be reconstructed by scanning the same sample surface or the same features of the sample surface by two or more of the predefined shapes.

Figure 6:
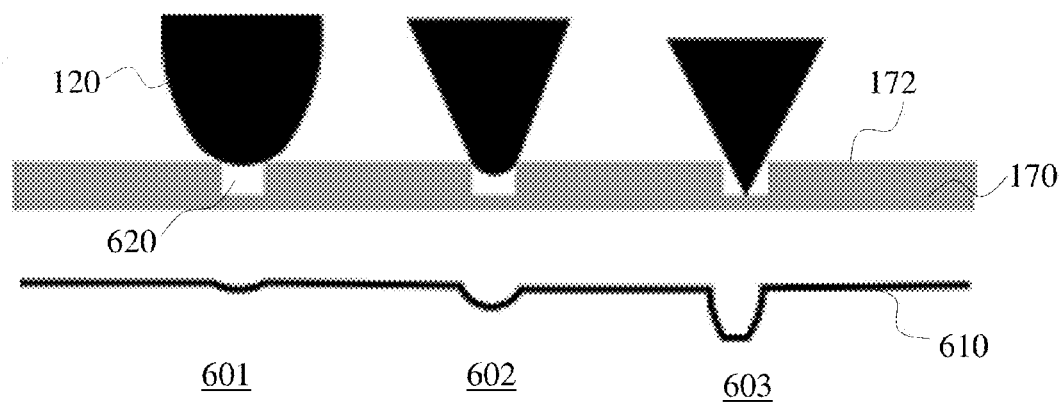
FIG. 6 shows shapes of a probe tip of a scanning probe sensor that is operated in a contact scanning mode and the corresponding topography measurement signal, wherein the probe tips have different shapes to image a surface trench in the surface of the sample.

In the embodiment of FIG. 6 a sample 170 is provided that comprises trenches 620. A first shape 601 of the probe tip 120 with a rather flat tip cannot enter the trenches 620. Accordingly, a corresponding measurement signal 610 of the scanning probe microscope is rather small. A second shape 602 of the probe tip 120 with a sharper tip can enter the trenches 620 a bit. Accordingly, the corresponding measurement signal 610 of the scanning probe microscope is greater than the measurement signal provided by the first shape 601. A third shape 603 of the probe tip 120 is pretty sharp such that the tip can enter the trenches 620 until the bottom. Accordingly, the corresponding measurement signal 610 of the scanning probe microscope is greater than the measurement signals provided by the first shape 601 and the second shape 602.

According to another embodiment the ferromagnetic fluid 125 is electrically conductive and the scanning probe sensor 100 is configured to perform electrical measurements related to electronic transport within the ferromagnetic fluid 125. This allows performing conductive AFM or scanning spreading resistance microscopy or scanning tunneling microscopy.

Generally the resistance of oil based ferromagnetic fluids is quite high in the range of $10^{10}$ ohms per cm, hence almost dielectric in nature. According to embodiments, a ferromagnetic fluid composition as described in U.S. Pat. No. 4,604,229 is used. U.S. Pat. No. 4,604,229 is herewith incorporated by reference. According to this embodiment the electrically conductive ferrofluid composition may consist essentially of: a nonvolatile liquid carrier; colloidal-size single domain magnetic particles in an amount sufficient to provide magnetic properties to the ferrofluid composition; colloidal-size electrically conductive carbon particles in an amount sufficient to provide electrical conductive properties to the ferrofluid composition; and a dispersing agent in an amount sufficient to disperse and stabilize the colloidal magnetic and electrically conductive carbon particles in the liquid carrier.

By using such a composition the ferromagnetic fluid can be rendered conductive to a point of 100 ohm.cm. This is sufficient for performing electrical measurements, such as conductive AFM or scanning spreading resistance microscopy.

Embodiments of the invention having probe tips with electrically conductive ferromagnetic fluids may also support experiments where the probe tip is used as a local soldering probe such that by application of controlled electrical pulses the contact resistance between a nanomaterial (e.g. carbon nanotubes, nanowires, 2D materials) and their respective contact metal can be reduced. With a probe tip comprising a ferromagnetic fluid according to embodiments of the invention the forces interacting between the probe tip and the sample can be controlled to an optimal level and the lifetime of such embodied tips may be significantly higher than the lifetime of a conventional conductive AFM tip.

Figure 7:
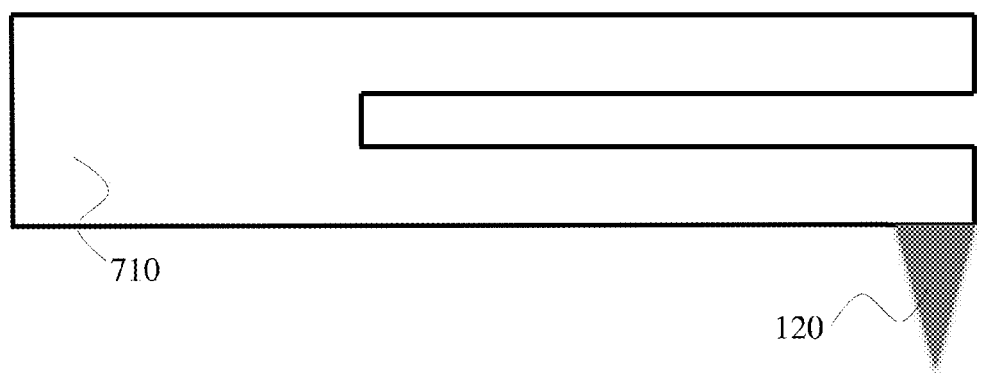
FIG. 7 shows a tuning fork comprising a ferromagnetic probe tip of a scanning probe sensor according to another embodiment of the invention.

FIG. 7 shows another embodiment of the invention comprising a tuning fork 710. In this embodiment the probe tip 120 is arranged on the tuning fork 710 instead of a cantilever. Providing the probe tip 120 on scanning probe microscopy systems having a tuning fork provides similar advantages as with scanning probe systems having a cantilever.

Probe tips comprising ferromagnetic fluids according to embodiments of the invention may be in particular beneficial for scanning probe microcopy of biomaterials of reduced dimensions encompassing single bacterial cells anchored on surfaces as well as long chain genomic molecules such as ss-DNA and RNA. The advantage that such probe tips may provide over a conventional hard silicon nitride tip is the ability to produce faithful reproduction of the actual surface and topology of the biomaterial under study without inducing rupture or puncturing the cell linings. According to such embodiments a non-intrusive and label-free analysis of biomaterials with high lateral resolution may be provided.

Figure 8:
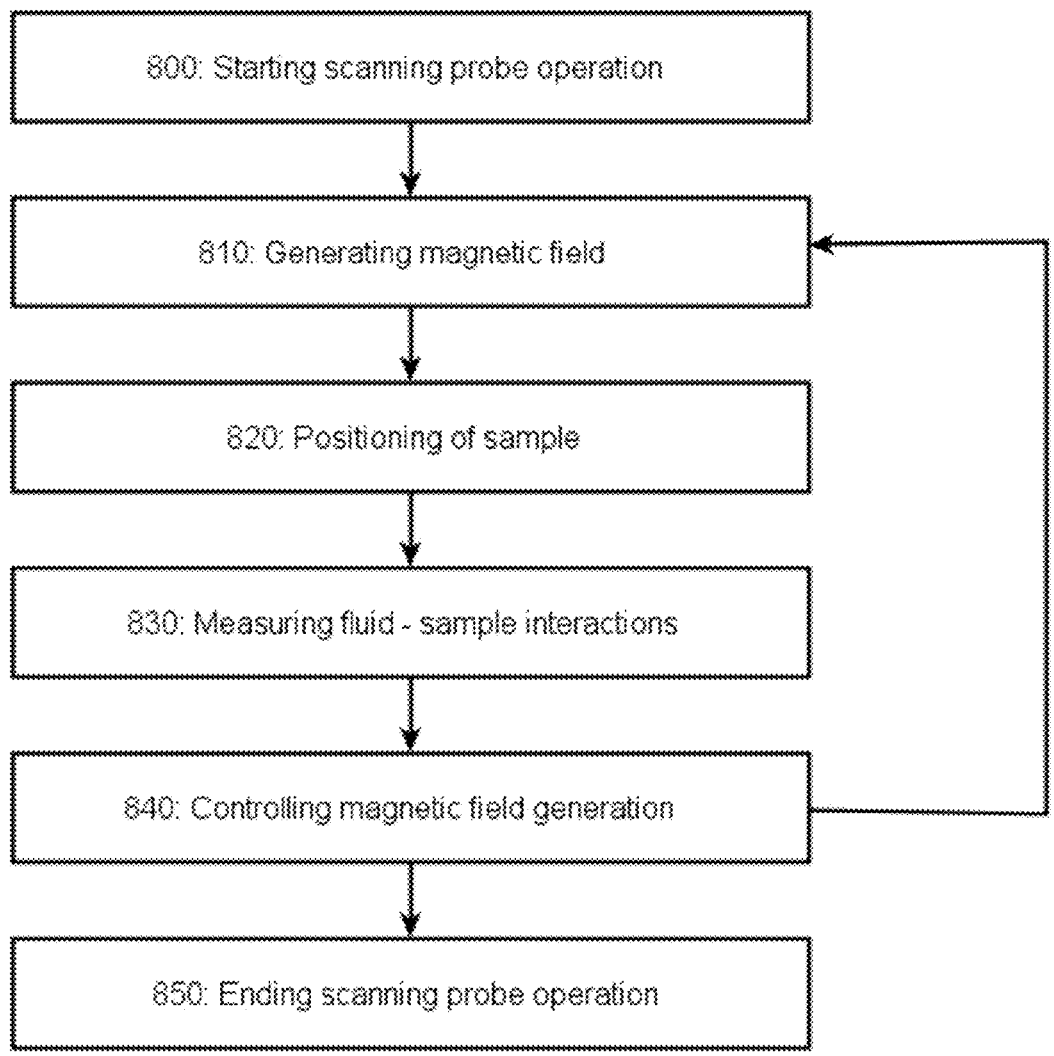
FIG. 8 shows method steps of a method for operating a scanning probe sensor according to embodiments of the invention.

FIG. 8 illustrates method steps of a method for operating a scanning probe sensor according to embodiments of the invention.

As shown at block 800, the scanning probe operation is started. As shown at block 810, the magnetic field generator 130 generates a magnetic field B acting on the ferromagnetic fluid 125. As shown at block 820, the sample 170 is positioned relative to the probe tip by the sample positioner 175. As shown at block 830, fluid—sample interactions are measured as scanning probe measurement signals. As shown at block 840 one or more parameters of the magnetic field generator 130 are controlled, thereby controlling the shape of the ferromagnetic fluid 125. In particular the shape of the fluid 125 is controlled in dependence on interactions between the fluid 125 and block sample 170 as provided by the scanning probe measurement signals measured in step 830. The block 810, 820, 830 and 840 are repeated in an iterative manner. Finally, as shown at block 850 the scanning probe operation is ended.

The present invention may be a system, a method, and/or a computer program product. The computer program product may include a computer readable storage medium (or media) having computer readable program instructions thereon for causing a processor to carry out aspects of the present invention.

The invention may be in particular embodied as a computer program product for controlling the scanning probe sensor 100. The computer program product may be loaded e.g. into the sensor controller 150. The computer program product has a computer readable storage medium having stored thereon program instructions executable by the sensor controller 150 of the scanning probe sensor 100 to cause the scanning probe sensor 100 to control one or more parameters of the magnetic field generated by the magnetic field generator 130, thereby controlling the shape of the ferromagnetic fluid 125.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 9:
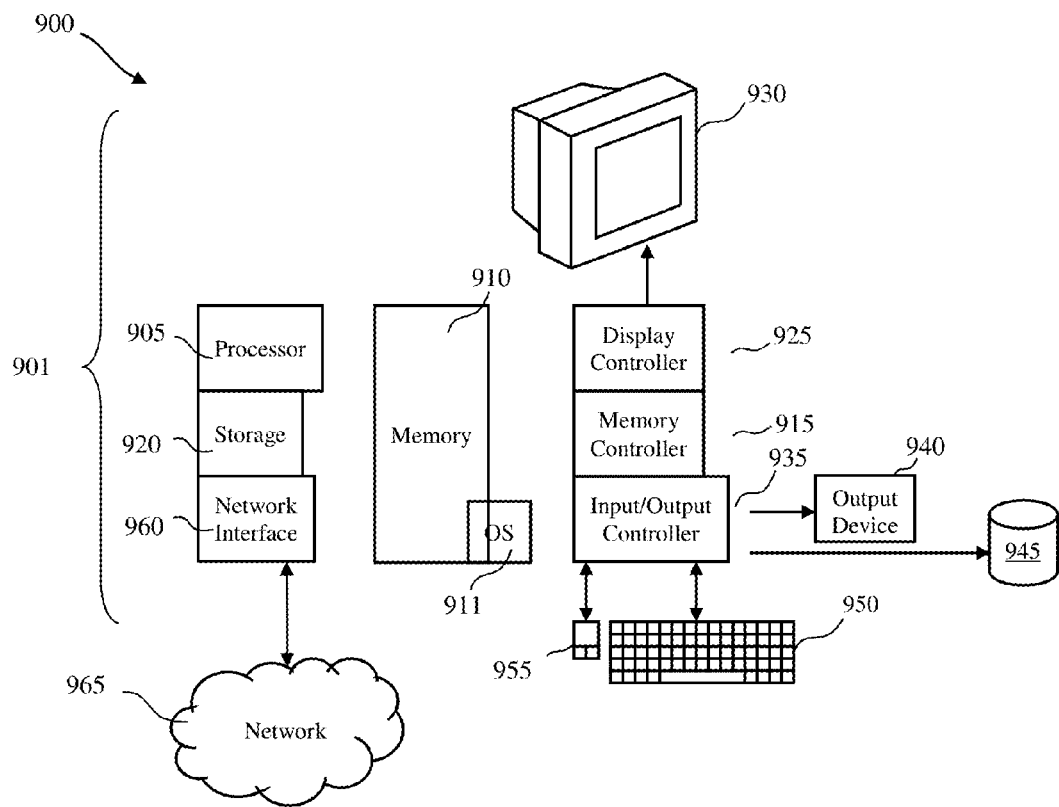
FIG. 9 shows a schematic block diagram of an embodiment of a computer system adapted to operate a scanning probe microscope.

FIG. 9 shows a schematic block diagram of an embodiment of a computer system adapted to operate a scanning probe microscope as e.g. the computer system 180 as described with reference to FIG. 1.

Computerized devices may be suitably designed for implementing embodiments of the present invention as described herein. The methods for operating a scanning probe sensor and a scanning probe microscope as described herein may be implemented in software (e.g., firmware), hardware, or a combination thereof. In exemplary embodiments, the methods described herein are implemented in software, as an executable program, the latter executed by suitable digital processing devices.

For instance, the system 900 depicted in FIG. 9 schematically represents a computer 901, e.g., a general-purpose computer. In exemplary embodiments, in terms of hardware architecture, as shown in FIG. 9, the computer 901 includes a processor 905, memory 910 coupled to a memory controller 915, and one or more input and/or output (I/O) devices 940, 945, 950, 955 (or peripherals) that are communicatively coupled via a local input/output controller 935. The input/output controller 935 can be, but is not limited to, one or more buses or other wired or wireless connections, as is known in the art. The input/output controller 935 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 905 is a hardware device for executing software, particularly that stored in memory 910. The processor 905 can be any custom made or commercially available processor, a central processing unit (CPU), an auxiliary processor among several processors associated with the computer 901, a semiconductor based microprocessor (in the form of a microchip or chip set), or generally any device for executing software instructions.

The memory 910 can include any one or combination of volatile memory elements (e.g., random access memory) and nonvolatile memory elements. Moreover, the memory 910 may incorporate electronic, magnetic, optical, and/or other types of storage media. Note that the memory 910 can have a distributed architecture, where various components are situated remote from one another, but can be accessed by the processor 905.

The software in memory 910 may include one or more separate programs, each of which comprises an ordered listing of executable instructions for implementing logical functions. In the example of FIG. 9, the software in the memory 910 includes methods described herein in accordance with exemplary embodiments and a suitable operating system (OS) 911. The OS 911 essentially controls the execution of other computer programs, such as the methods as described herein, and provides scheduling, input-output control, file and data management, memory management, and communication control and related services.

The methods described herein may be in the form of a source program, executable program (object code), script, or any other entity comprising a set of instructions to be performed. When in a source program form, then the program needs to be translated via a compiler, assembler, interpreter, or the like, as known per se, which may or may not be included within the memory 910, so as to operate properly in connection with the OS 911. Furthermore, the methods can be written as an object oriented programming language, which has classes of data and methods, or a procedure programming language, which has routines, subroutines, and/or functions.

Possibly, a conventional keyboard 950 and mouse 955 can be coupled to the input/output controller 935 (in particular for the BS, if needed). Other I/O devices 940-955 may include sensors (especially in the case of network elements), i.e., hardware devices that produce a measurable response to a change in a physical condition like temperature or pressure (physical data to be monitored). Typically, the analog signal produced by the sensors is digitized by an analog-to-digital converter and sent to controllers 935 for further processing. Sensor nodes are ideally small, consume low energy, are autonomous and operate unattended.

In addition, the I/O devices 940-955 may further include devices that communicate both inputs and outputs. The system 900 can further include a display controller 925 coupled to a display 940. In exemplary embodiments, the system 900 can further include a network interface or transceiver 960 for coupling to a network 965.

The network 965 transmits and receives data between the computer 901 and external systems. The network 965 is possibly implemented in a wireless fashion, e.g., using wireless protocols and technologies, such as WiFi, WiMax, etc. The network 965 may be a fixed wireless network, a wireless local area network (LAN), a wireless wide area network (WAN) a personal area network (PAN), a virtual private network (VPN), intranet or other suitable network system and includes equipment for receiving and transmitting signals.

The network 965 can also be an IP-based network for communication between the computer 901 and any external server, client and the like via a broadband connection. In exemplary embodiments, network 965 can be a managed IP network administered by a service provider. Besides, the network 965 can be a packet-switched network such as a LAN, WAN, Internet network, etc.

If the computer 901 is a PC, workstation, intelligent device or the like, the software in the memory 910 may further include a basic input output system (BIOS). The BIOS is stored in ROM so that the BIOS can be executed when the computer 901 is activated.

When the computer 901 is in operation, the processor 905 is configured to execute software stored within the memory 910, to communicate data to and from the memory 910, and to generally control operations of the computer 901 pursuant to the software. The methods described herein and the OS 911, in whole or in part are read by the processor 905, typically buffered within the processor 905, and then executed. When the methods described herein are implemented in software, the methods can be stored on any computer readable medium, such as storage 920, for use by or in connection with any computer related system or method.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A scanning probe sensor for a scanning probe microscope, the scanning probe sensor comprising:
   a probe tip comprising a ferromagnetic fluid;
   a magnetic field generator adapted to generate a magnetic field acting on the ferromagnetic fluid; and
   a sensor controller configured to control one or more parameters of the magnetic field generator, thereby controlling the shape of the fluid.

2. A scanning probe sensor according to claim 1, wherein the sensor controller is configured to control the shape of the fluid in dependence on interactions between the fluid and a sample.

3. A scanning probe sensor according to claim 1, wherein the sensor controller is configured to control the strength of the magnetic field.

4. A scanning probe sensor according to claim 1, wherein the sensor controller is configured to control one or more directions of the magnetic field.

5. A scanning probe sensor according to claim 1, the probe tip comprising a solid core surrounded by the ferromagnetic fluid.

6. A scanning probe sensor according to claim 1, the probe tip comprising a solid carrier structure comprising a channel for the ferromagnetic fluid.

7. A scanning probe sensor according to claim 1, the probe tip consisting of the ferromagnetic fluid.

8. A scanning probe sensor according to claim 1, the scanning probe sensor comprising:
   a reservoir for the ferromagnetic fluid; and
   a pump for pumping the ferromagnetic fluid from the reservoir to the probe tip.

9. A scanning probe sensor according to claim 1, wherein the scanning probe sensor is configured to operate in a non-contact scanning mode.

10. A scanning probe sensor according to claim 9, wherein the sensor controller is configured to control the one or more parameters of the magnetic field generator such that the shape of the fluid changes periodically.

11. A scanning probe sensor according to claim 1, wherein the scanning probe sensor is configured to operate in a contact scanning mode.

12. A scanning probe sensor according to claim 11, wherein the sensor controller is configured to control the one or more parameters of the magnetic field generator such that the size of the contact area between the fluid and a sample is dynamically adapted.

13. A scanning probe sensor according to claim 1, wherein the ferromagnetic fluid is electrically conductive and the scanning probe sensor is configured to perform electrical measurements related to electronic transport within the fluid.

14. A scanning probe sensor according to claim 1, wherein the sensor controller is configured to control the one or more parameters of the magnetic field generator such that a plurality of predefined tip shapes are provided.

15. A scanning probe sensor according to claim 1, the scanning probe sensor comprising a cantilever, wherein the probe tip is arranged on the cantilever.

16. A scanning probe sensor according to claim 1, the scanning probe sensor comprising a tuning fork, wherein the probe tip is arranged on the tuning fork.

17. A scanning probe microscope comprising:
   a scanning probe sensor comprising:
      a probe tip comprising a ferromagnetic fluid;
      a magnetic field generator adapted to generate a magnetic field acting on the ferromagnetic fluid; and
      a sensor controller configured to control one or more parameters of the magnetic field generator, thereby controlling the shape of the fluid
   a sample positioner configured to position a sample in relation to the scanning probe sensor; and
   a system controller configured to control the sample positioner and the scanning probe sensor.

18. A scanning probe microscope of claim 17, wherein the sensor controller is configured to control the shape of the fluid in dependence on interactions between the fluid and a sample.

19. A scanning probe microscope of claim 17, wherein the sensor controller is configured to control the strength of the magnetic field.

20. A scanning probe microscope of claim 17, wherein the sensor controller is configured to control one or more directions of the magnetic field.

* * * * *